March 19, 1968

C. C. MOORE 3,373,472

METHOD OF MAKING A BALL BEARING ASSEMBLY
AND LOCKING COLLAR THEREFOR

Filed Sept. 22, 1965

INVENTOR
CHESTER C. MOORE
BY
ATT'YS

March 19, 1968 C. C. MOORE 3,373,472
METHOD OF MAKING A BALL BEARING ASSEMBLY
AND LOCKING COLLAR THEREFOR
Filed Sept. 22, 1965 6 Sheets-Sheet 5

INVENTOR
CHESTER C. MOORE
BY Mann, Brown & McWilliams
ATT'YS

United States Patent Office 3,373,472
Patented Mar. 19, 1968

3,373,472
METHOD OF MAKING A BALL BEARING ASSEMBLY AND LOCKING COLLAR THEREFOR
Chester C. Moore, Aurora, Ill., assignor to Stephens-Adamson Mfg. Co., a corporation of Illinois
Filed Sept. 22, 1965, Ser. No. 489,141
5 Claims. (Cl. 29—148.4)

ABSTRACT OF THE DISCLOSURE

The invention has to do with a method of making a ball bearing assembly and methods and apparatus for making a locking collar therefor. The ball bearing assembly is concerned with using a special inner race member that receives a shaft or the like to be journalled and has at least one end of same formed with a plurality of spaced slots extending longitudinally thereof, assembling an outer race and bearing balls in abutting relation therewith, and applying a C-shaped clamping collar to the inner race slotted end portion and clamping the collar against the inner race to lock the inner race to the shaft or the like.

The methods and apparatus for making the locking collar involve coiling a length of bar stock into a helix, separating the turns of the helix into locking collar members, press forming the individual locking collar members to a predetermined internal diameter with their end portions pressed together, then milling the collar member end portions at right angles to the axis of the collar to define drilling recesses in the external O.D. of the collar member, then forming the collar member end portions to define a slot therebetween and cap screw mounting openings for applying a cap screw thereto to clamp the locking collar to the bearing inner race.

---

My invention relates to a method of making a ball bearing assembly and locking collar therefor, and more particularly, to a method of making ball bearing devices employing inner race rings and a locking collar for securing the inner race ring to a shaft, including a method of making the locking collar.

Heretofore ball bearing units of the type shown in Richmond Patent 3,189,979, granted June 22, 1965, have been arranged to have their inner races secured to the shaft by set screws or by cam action devices, which not only have tended to cock the inner race somewhat off the axial center of the shaft, but also frequently in a cocked position. This has been the source of an undue amount of vibration on the shaft and bearing, and has frequently resulted in fretting corrosion that causes the inner race to become frozen to the shaft; also, a marring and moving away of the shaft itself frequently results, which sometimes results in having to replace the shaft.

A principal object of this invention is to provide a bearing assembly arrangement in which the inner race may be firmly secured to the shaft in perfect axial alignment therewith.

Another principal object of this invention is to provide a method of making or assembling ball bearing assemblies which provide a ball bearing unit that is readily applied to the shaft without any substantial misalignment, and which may be readily removed even after a long period of use.

Another principal object of the invention is to provide a method of making locking collars for use in connection with ball bearing assemblies that substantially reduces the cost of manufacture of the bearing and provide a product of uniformly high quality characteristics.

Other objects of the invention are to provide improved apparatus for making locking collars, to provide improved coining procedures in connection with the making of locking collars, and to provide a locking collar arrangement that is economical of manufacture, efficient and long lived in use and susceptible of a wide variety of applications.

Other objects, uses, and advantages will be obvious or become apparent from a consideration of the following detailed description and the application drawings.

However, it is to be distinctly understood that the specific drawing illustrations provided are supplied primarily to comply with the requirements of the Patent Code, and that the invention may have other specific embodiments which are intended to be covered by the appended claims.

General description of bearing unit

Referring now more specifically to FIGURES 1–4 of the drawings, reference numeral 10 generally indicates a pillow block ball bearing unit of the type that may be made by practicing my invention.

Figures 1, 2, 3, 4:
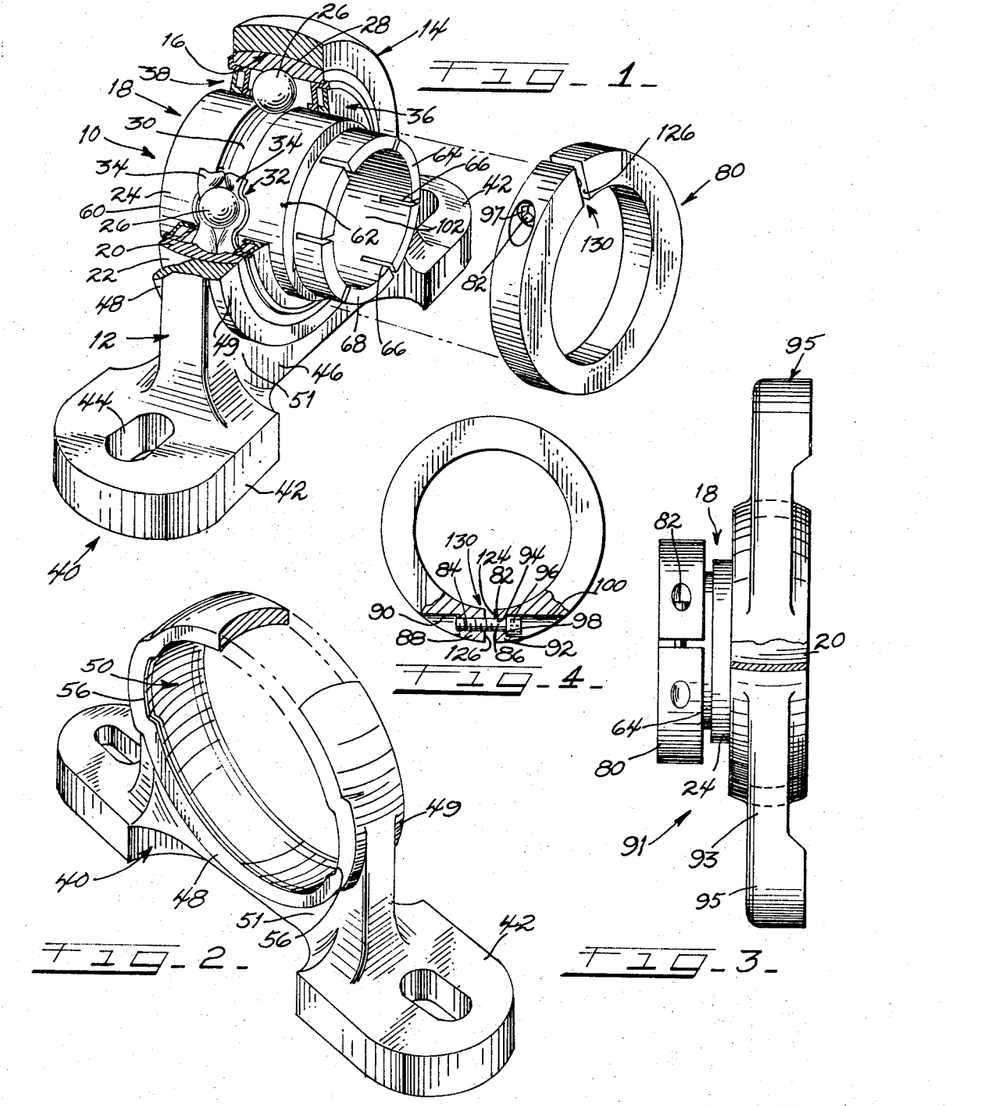
FIGURE 1 is a perspective view, partially in section, showing a completed ball bearing pillow block type unit of the type to which this invention relates, showing the locking collar of this unit displaced from its locking position on the bearing assembly inner race.
FIGURE 2 is a perspective view, partially in section, showing one form of pillow block housing that may be used in the fabrication of pillow block ball bearing units arranged in accordance with this invention.
FIGURE 3 is a side elevational view of a flange type ball bearing unit equipped with the ball bearing assembly of FIGURE 1.
FIGURE 4 is a plan view of the locking collar employed in connection with the ball bearing assembly of FIGURE 1, with parts being shown in section.

The bearing unit 10 generally comprises a pillow block type housing 12 provided with an annular housing portion 14 that in the form shown is provided with a spherically contoured bearing seat 16 in which is swivably mounted a ball bearing assembly 18 arranged in accordance with this invention.

The ball bearing assembly 18 comprises an outer race 20 provided with a spherically contoured external surface or periphery 22 that is complementary to and coacts with the housing portion bearing seat 16, an inner race 24, a plurality of bearing balls 26 mounted in the ball race grooves 28 and 30 of the respective races, a suitable type of ball retainer device 32, which in the form shown comprises a pair of rings 34 that are formed and riveted or clamped together in any conventional manner to space the balls 26 equidistantly from each other, and sealing ring assemblies 36 and 38 applied between the inner and outer races on either side of the ball bearing assembly to form a seal for the bearing unit.

The housing 12 further comprises a base 40 provided with a pair of feet or lugs 42 that are formed with suitable openings 44 for the reception of mounting screws or bolts or the like. The annular housing portion 14 of the pillow block housing 12 defines an opening 50, and is connected to the feet or lugs 42 by an upstanding vertical wall portion 46, and in the form shown, the annular housing portion 14 defines end portions 48 and 49 that project beyond the side surfaces 51 of the wall portion 46.

As indicated in FIGURE 2, the end portion 48 of the housing portion 14 is formed with loading slots 56 for receiving preassembled bearing assemblies 18.

The housing 12 as shown in FIGURE 2 may be made in accordance with the teachings of said Richmond patent (the disclosure of which is incorporated herein by this reference), and when so made, is adapted to receive ball bearing assemblies that are assembled in accordance with this invention.

Method of making bearing unit

The housing 12 is cast or formed from a suitable ductile or malleable material, such as ductile cast iron, nodular iron, malleable cast iron, perlitic malleable iron, Meehanite, bronze, aluminum bronze or the like.

The inner race 24 is formed from steel, with the zone of the inner race that defines the raceway 30 being hardened in any suitable manner, leaving the end portions 60 and 62 unhardened, and thus relatively soft as compared to the hardened raceway. The end portion 64 of reduced external diameter that is formed with a plurality of slots 66 that extend longitudinally of the axis of the inner race and that are equally spaced about the circumference of the inner race. The slots 66 define resilient gripping fingers 68 that are employed to clamp the inner race 24 to a shaft over which the inner race is received in the normal operating position of bearing unit 10.

The bearing assembly 18 is assembled by taking the inner race 24 and placing it within the outer race 22 and applying a plurality of bearing balls 26 therebetween in any convenient manner. The retaining rings 34 are inserted from the sides of the assembly and are riveted or clamped together in any conventional manner to properly hold the balls 26 in their proper spaced relationship within the bearing grooves. The bearing assembly is then sealed by applying the seal assemblies 36 and 38 in any known manner.

The thus assembled bearing assembly is applied to the housing 12 by turning the assembly so that its plane extends perpendicular to the plane of the housing portion 14, and then inserting the outer race 22 into the loading slots 56 until the center of the outer race is substantially aligned with the center of the bearing seat 16. The bearing assembly 18 may then be rotated 90 degrees into substantial coplanar relation with the housing portion 14, and locking collar 80 arranged and made in accordance with this invention is applied over extension 64 to serve as a device to clamp the inner race to the shaft it cooperates with. Locking collar 80 includes a cap screw 82, that has a threaded portion 84 of its stem or body 86 screw threadedly received in an end portion 88 of the collar so that the collar can be contracted against the fingers 68 to clamp the inner race to a shaft.

The locking collar end portion 88 is recessed or enlarged as at 90, and the other end portion 92 of the locking collar is formed with a bore 94 through which cap screw 82 extends, with the head 96 of the cap screw seating against a shoulder 98 that is defined by a recess 100 formed in the end portion 92.

In use, the bearing unit 10 as shown in FIGURE 1 with the locking collar 80 slipped in place over the fingers 68 is applied to the shaft the bearing unit is to journal by slipping the shaft through the bore 102 of the inner race, and after the shaft and bearing unit have been appropriately positioned with respect to each other, a suitable turning tool is applied to the cap screw 82 to contact the collar 80 against the fingers 68 and draw the fingers 68 into tight clamping engagement with the shaft surface. Cap screw 82 has its head 96 formed with a suitably shaped polygonal indentation 97 adapted to cooperate with a complementarily shaped tool for this purpose.

The result is that the inner race is securely made fast to the shaft in exact axial alignment therewith and without marring or damaging the surface of the shaft in any way.

FIGURE 3 shows a flange type bearing unit 91 that includes flange type housing 93 having a bearing assembly 18 including a locking collar 80 applied thereto. Housing 93 differs from housing 12 primarily in that it is provided with lugs 95 adapted for flange type bearing applications. Unit 91 is otherwise the same as unit 10, as indicated by corresponding reference numerals, assembly 18 being applied through loading slots (not shown) that are the same as loading slots 56 of FIGURE 2. Unit 91 is thus assembled following the same steps described above.

Method of making the locking collar

The locking collar 80 is preferably made in the manner now to be described.

Figures 5, 6:
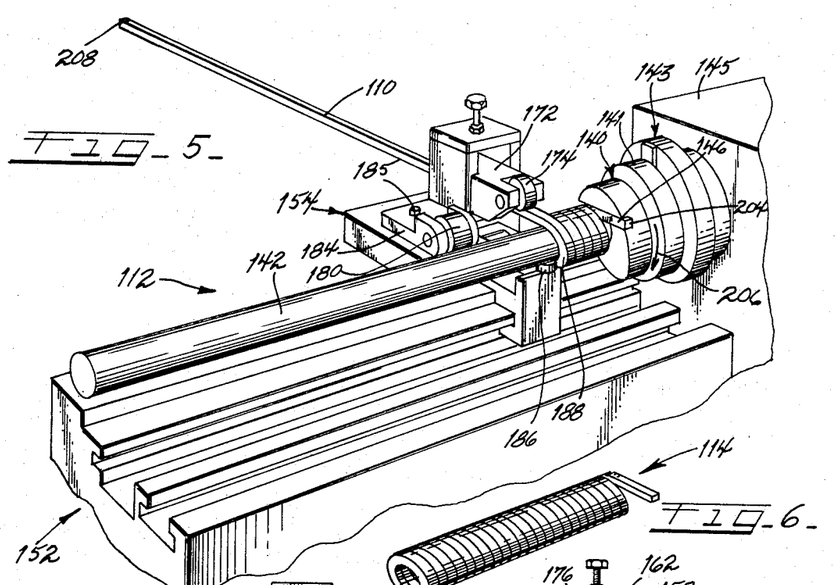
FIGURE 5 is a diagrammatic perspective view illustrating an initial step in the method of making the locking collar of FIGURE 4 in accordance with this invention.
FIGURE 6 is a diagrammatic perspective view of the intermediate product resulting from the procedure illustrated in FIGURE 5.

Referring to FIGURES 5–8, a section of bar stock 110 of square section is applied to a coiling apparatus 112 that is shown in FIGURES 5–8 to coil the bar stock 110 into a tight helix, an example of which is shown at 114 in FIGURE 6. The helix is removed from apparatus 112 and is split to form individual lock washer shaped collar blanks by employing the cutting apparatus 116 illustrated in FIGURES 9 and 10, after which the individual blanks 118 are flattened by employing the die apparatus shown in FIGURE 12, and then the blanks are individually coined to the final locking collar external and internal diameters by employing the die apparatus 122 shown in FIGURES 15–17.

The individual locking collar blanks are then processed in the manner indicated in FIGURES 18–23 to form the recesses and holes in the locking collar that receive the cap screw 82, and in the course of this processing, the end portions 88 and 92 of the locking collar are formed with oppositely disposed planar surfaces 124 and 126 (see FIGURE 4) that define the gap 130 between the end portions of the locking collar.

The individual locking collars are then tumbled and coated as may be necessary or desirable, after which the individual cap screws are applied to the respective locking collars.

Apparatus for coiling the bar stock

Referring now more specifically to FIGURES 5–8, the apparatus 112 comprises a rotating head 140 carrying an elongate arbor 142 that is aligned with the axis of rotation of the head 140 and is affixed to the rotating head for rotation therewith in any suitable manner. Head 140 is secured in a suitable collet or the like device 141 that forms part of a rotatable structure 143 that is suitably mounted in housing structure 145 containing suitable means for rotating head 140.

The rotating head 140 is formed with a slot 144 proportioned to complement the bar stock being coiled, and which receives the end 146 of the bar stock that is initially applied to the apparatus 112.

The rotating head 140, between the slot 144 and the diametrically opposite side 147 of the head, is formed with a planar pitch forming surface 148 that preferably makes an angle with respect to the axis of rotation of the head that lies in the range of from about 81 to about 84 degrees, with the angled surface 148 being oriented to have its plane intersect the undercorner 150 of recess 144 (see FIGURE 8) and extend axially of the direction of rotation away from the arbor 142.

A bed structure 152 is mounted underneath the rotating head 140 on which is slidably mounted a carriage 154 carrying a bar stock feed guide structure 156 in the form of a frame including side plates 158 and 160, suitably affixed to the carriage structure 154, and braced at their upper ends by a top plate 162 that is secured to the respective plates 158 and 160 by screws or the like.

Mounted between the plates 158 and 160 at their sides 164 is a guide plate 166 formed with a quadrilateral guide opening 168 through which the bar stock 110 is inserted on being applied to the groove or recess 144.

Mounted between the plates 158 and 160 as by bolts 170 is a support block 172 for a guide roller 174. Support block 172 is braced against the stock 110 by a bolt 176, which is positioned so that when the recess or slot 144 is horizontally disposed and carriage 154 is moved to the right of FIGURE 5 to position the guide opening 168 in alignment with the recess 144, the end 146 of the bar stock 110 may be readily inserted through the guide post 168 under roller 174 and into and through the slot 144.

The rear plate 166 should thus be positioned so that the guide opening 168 is horizontally aligned with recess 144 when the recess or slot 144 is horizontally disposed.

The carriage structure 154 also has applied thereto a pair of bracing rollers 180 and 182, which are journalled on a bracket structure 184 that is releasably mounted for movement toward and away from the arbor 142 as by employing bolts 185. The relation of bracing rollers 180 and 182 to arbor 142 is indicated diagrammatically in FIGURE 8A, and while the specifics of the journalling of roller 182 are omitted to simplify the drawings, it is intended that it be journalled on and move with bracket structure 184.

The carriage structure 154 journals a roller 186 that is disposed immediately under the arbor 142 and is positioned to engage the side surface 188 of the bar stock as it is being coiled by apparatus 112.

Carriage structure 154 is connected by pin 190 (see FIGURE 7) to piston rod 192 of a piston 194 received in hydraulic cylinder 196 that is fixedly secured in any suitable manner to one side of the apparatus 112, with conduits 198 and 199 communicating between either side of the piston 194 and a suitable pump 200. The piston 194 is formed with one or more passages 202 (see FIGURE 7A) extending through from the head side to the crank side thereof to permit hydraulic liquid to flow therethrough as the rod 192 is drawn outwardly of the cylinder 196.

Figures 7, 7A, 8, 8A:
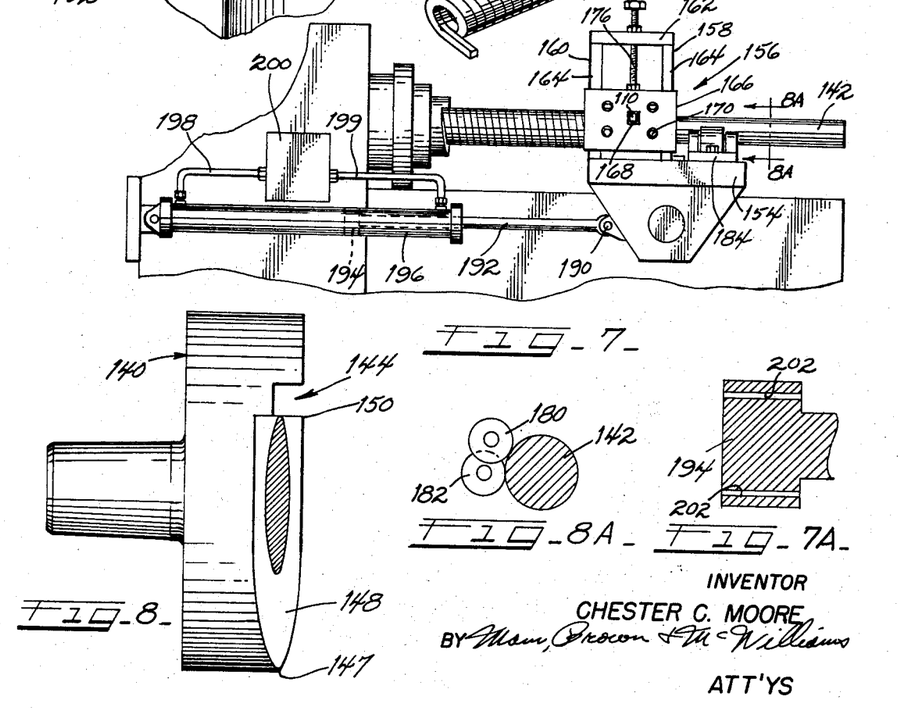
FIGURE 7 is a side elevational view of the apparatus as shown in FIGURE 5 taken from the rear of FIGURE 5.
FIGURE 7A is a fragmental cross-sectional view of a dash-pot device piston employed in the device of FIGURES 5–7.
FIGURE 8 is an enlarged elevational view of the rotating convoluting head that forms a part of the apparatus shown in FIGURE 5.
FIGURE 8A is a diagram illustrating the arbor bracing roller arrangement used in the apparatus of FIGURES 5–7, taken substantially along line 8A—8A of FIGURE 7.

In use, apparatus 112 is set to convolute a piece of bar stock 110 to the shape shown in FIGURE 6 by employing pump 200 to pump hydraulic liquid into the cylinder 196 at the crank side of piston 194 (the right hand side thereof as viewed in FIGURE 7) to return the carriage 154 to the right of FIGURE 7 to the point where guide opening 168 is in alignment with the vertical plane of rotatable head groove or recess 144. The groove or recess 144 is then horizontally disposed and the end 146 of the bar stock 110 inserted through opening 168 and disposed within the recess or groove 144 to the extent that the terminal portion 204 thereof is positioned approximately adjacent the corner 150 of the recess or groove 144. In addition, the bracket structure 184 that mount the rollers 180 and 182 is disposed so that the rollers 180 and 182 contact the arbor 142.

The head 140 is then rotated in the direction of the arrow 206, with the result that since the stock 110 is held against rotation by the carriage 154, the bar 110 is bent about the arbor 142, and as the head 140 continues to turn, the surface 148 cams the first turn of the bar to the pitch dictated by the 6 to 9 degree deviation of the surface 148 from a right angled position with respect to the arbor 142.

As the first turn of the bar is formed, the surface 188 of the bar contacts roller 186 with the result that the pitch being applied to the coiled portion of the bar biases the carriage 154 to the left of FIGURE 5 and the right of FIGURE 7.

As the head 140 continues to rotate, the bar 110 continues to be wound on the arbor 142 in a tight helix until the rear end 208 of the bar slips past the roller 174, at which point the intermediate product shown in FIGURE 6 is provided. Rollers 180 and 182 brace the arbor against reaction forces acting on it that tend to throw it out of the axis of rotation of head 140.

As the carriage 154 is moved to the left of FIGURE 5 and the right of FIGURE 7 under the biasing action of the roller 186 engagement with the surface 188 of the bar, a dash-pot holding effect is provided on the movement of the carriage 154 through the action of hydraulic liquid passing through the passages 202 of the piston 194.

Product 114 is then removed from arbor 142, after the bracket structure 184 has been loosened so that rollers 180 and 182 may be moved out of the way.

Helix cutting apparatus

Figure 9:
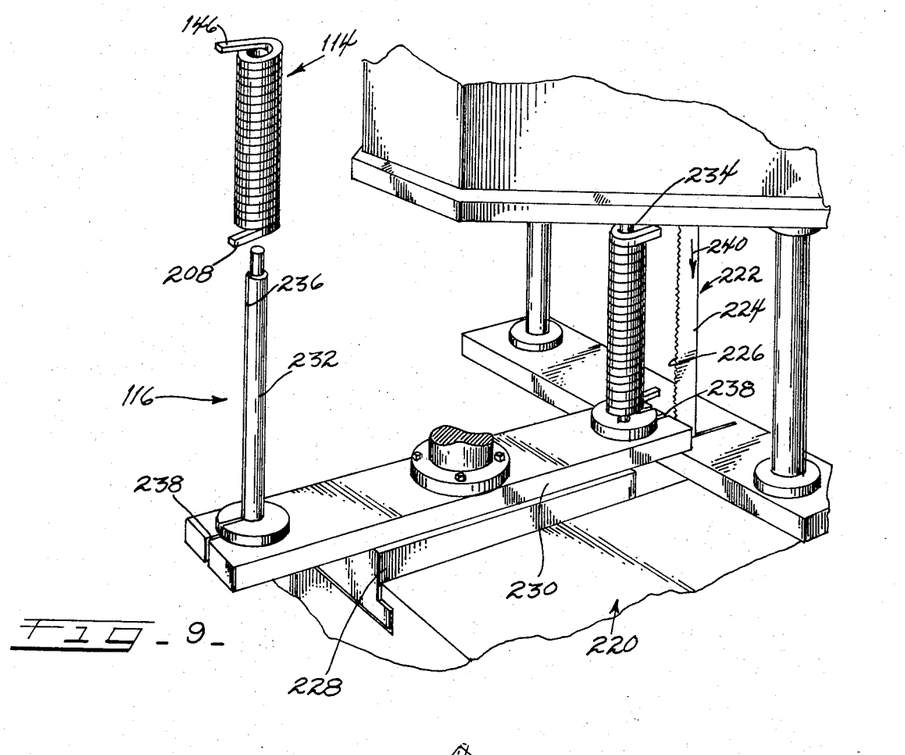
FIGURE 9 is a perspective view illustrating an arrangement for segmenting the intermediate product shown in FIGURE 6 into separate elements or blanks that are to be individually fabricated into the locking collars.
Figure 10:
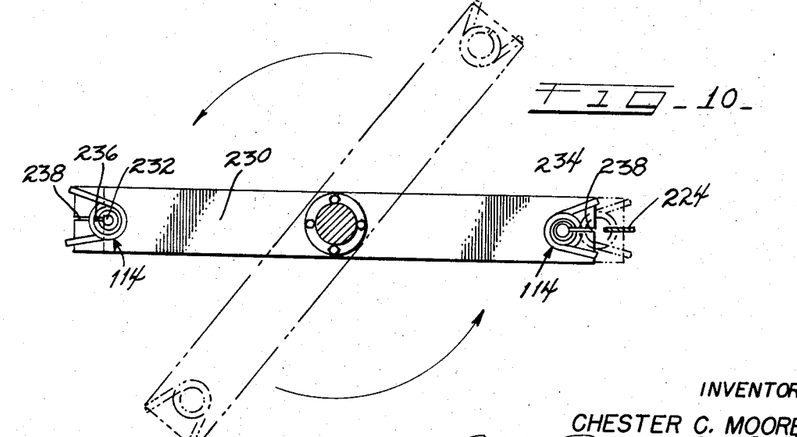
FIGURE 10 is a diagrammatic plan view of the principal components of the apparatus shown in FIGURE 9, illustrating the operation thereof.

The helix cutting apparatus 116 of FIGURES 9 and 10 is only diagrammatically illustrated, and comprises a bed 220 of a suitable apparatus which journals a band saw generally indicated at 222, one pass of which is shown at 224. Mounted for sliding movement toward and away from the cutting edge 226 of the band saw 222 is a carriage 228 that swingably mounts a beam 230 which carries at each of its ends an upright arbor 232 and 234, each of which is formed with a band saw blade receiving groove 236 that is placed in alignment with the band saw receiving notch 238 at the respective ends of beam 230.

Suitable means are provided for feeding the carriage 228 toward and away from the band saw blade pass 224.

In use, a helix 114 is applied to an upright arbor 232 when the arbor is in the position at the left hand side of FIGURE 9, with the helix being disposed with respect to the groove 236 so that the terminal end portion 146 and 208 are disposed approximately equidistantly on either side of the groove 236. The beam 230 is then swung approximately 180 degrees to dispose the helix 114 at the right side of FIGURE 9 in appropriate cutting relation with the band saw blade pass 224, in which relation the helix should be positioned approximately as shown at the right hand side of FIGURE 10 in the full line position. The carriage 228 is then fed toward the band saw blade pass 224 and the band blade 222 is actuated in the direction indicated by the arrow 240, and the relative movement of the carriage 228 disposes the band saw blade pass 224 first in the slit 238 at the base of the adjacent arbor 234, and thence the band saw blade pass comes into sawing engagement with the helix 114 and severs the helix longitudinally thereof to form a plurality of separate lock washer shaped segments or elements of the type indicated at 118 in FIGURE 11. After the sawing action has been completed, the movement of carriage 228 is reversed and the beam again moved 180 degrees to position the saw helix at the left hand side of FIGURE 9, whereupon the sawed helix elements may be removed from the arbor on which they have been placed.

The two arbor arrangement of beam 230 permits a second helix 114 in the meantime to have been placed on the other arbor, and this helix is then run through the sawing operations as the helix segments are removed from the other arbor.

This arrangement permits all portions of the helix to be formed into locking collars except the end portions 146 and 208 which are discarded.

The individual helix segments or elements 118 are then subjected to the method steps employed in the operation of the apparatus shown in FIGURES 11-23 to complete the formation of the individual locking collar structures, except for the application of the cap screw.

*Helix segment flattening apparatus*

Figures 11, 12, 13:
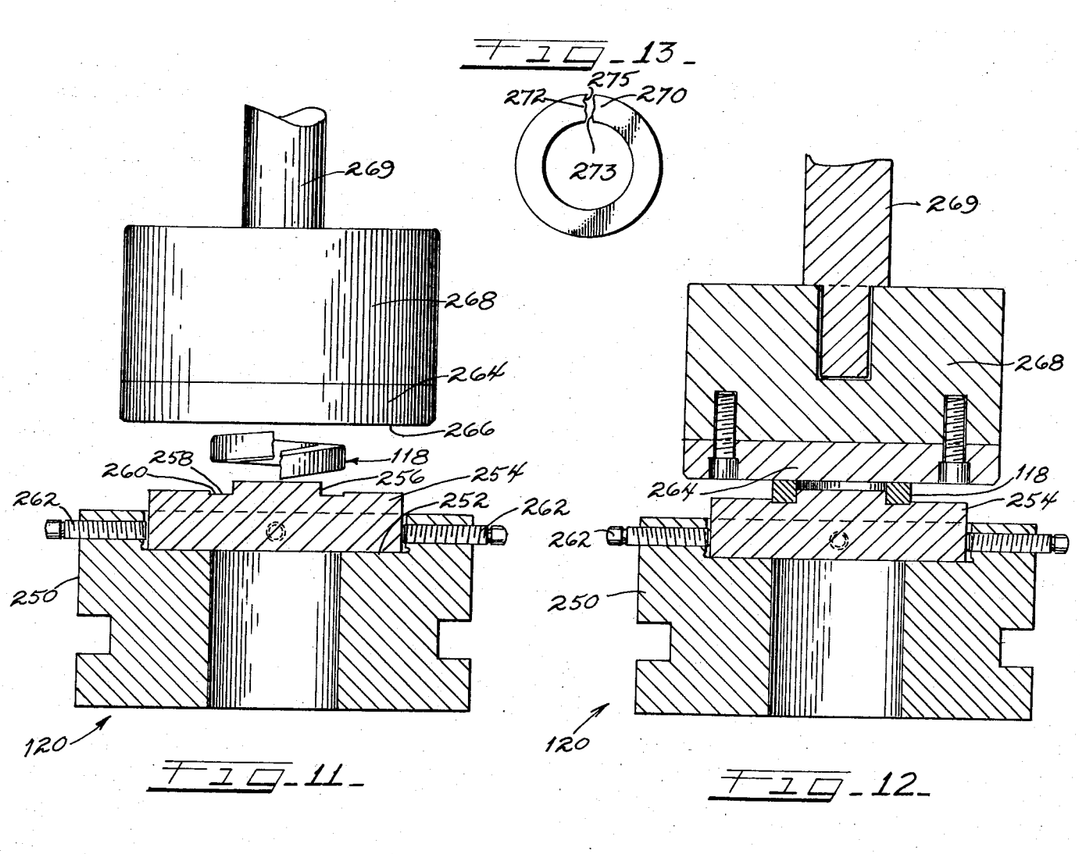
FIGURES 11 and 12 illustrate a die arrangement for flattening the lock washer shaped elements or blanks that are formed by employing the apparatus shown in FIGURES 9 and 10.
FIGURE 13 is a plan view of the locking collar blank as it appears after leaving the die shown in FIGURES 11 and 12.

The helix segment flattening apparatus 120 comprises a lower fixed plate structure 250 supporting in a recess 252 a lower die plate 254 which is provided with a stud portion 256 having a diameter approximating the internal diameter of the helix elements. The lower die plate 254 at the base of the stud portion 256 is formed with an annular groove or recess 258 having a substantially planar bottom surface 260.

The die plate 254 is held in position in the form shown by suitable set screws 262.

Apparatus 120 also includes an upper die plate structure 264 having a planar working surface 266 that is disposed in a plane parallel to the plane of the recess surface 260. Stud portion 256 is disposed perpendicular to the surfaces.

The upper die plate 264 is affixed to a ram head 268 that is actuated by a suitable ram rod 269 to force the die plate 264 in the direction of die plate 254 when an element 118 is interposed therebetween, and to retract the die plate 264 away from same after the flattening operation has been completed.

In operation, an element 118 in the form shown in FIGURE 11 is placed over the stud portion 256 so that it will rest on surface 260 of annular recess or groove 258. The ram actuating upper die plate 264 is then actuated to move same to the position of FIGURE 12 to flatten same.

In achieving this end, the ram operating the upper die plate 264 is provided with a pressure sensitive control valve arrangement that initiates a reversal in the movement of the die plate 264 when the pressure has been achieved that will complete the flattening of the element 118 to the desired planar configuration, which is shown in FIGURE 13.

It will be noted that the flattened element 118 still has the end portions 270 and 272 thereof spaced from each other in the flattened condition of the element 118, although the somewhat jagged nature of the surfaces 273 and 274 resulting from the previously described sawing action still remain.

The element 118 is now moved to a separate coining apparatus 122 for the purpose of giving the element 118 its final external and internal diameter configuration.

*Coining apparatus*

The coining apparatus 122 (see FIGURES 15-17) comprises a fixed lower die plate structure 280 including an annular die plate 282 formed with a cylindrical coining surface 284 that is to define the external diameter of the locking collar. The coining surface 284 is formed with a tapered mouth 285 on which the element 118 is rested prior to performing the coining operation.

Figure 15:
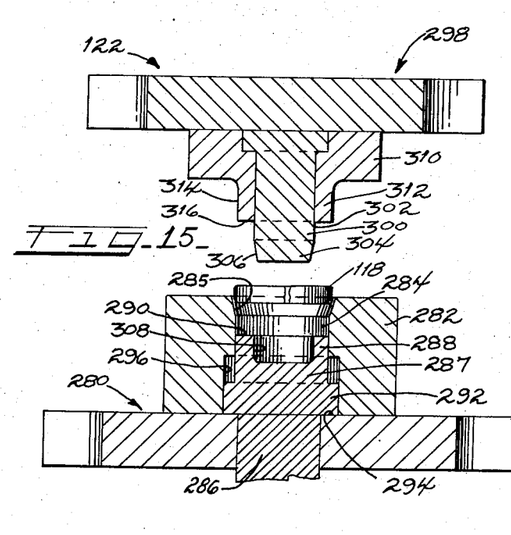
FIGURES 15–17 illustrate a die arrangement for coining the locking collar blank to its predetermined external and internal diameters, with these three figures showing separate steps during the operation of the dies.
Figure 16:
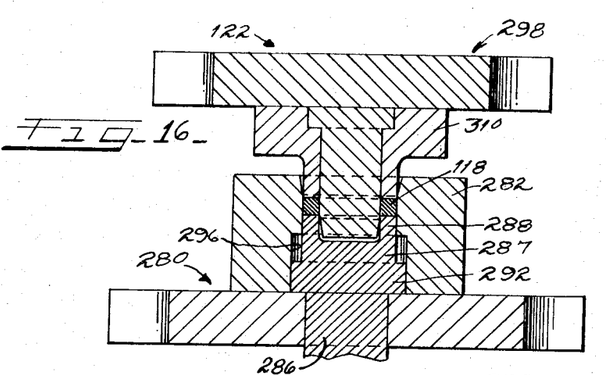
Figure 17:
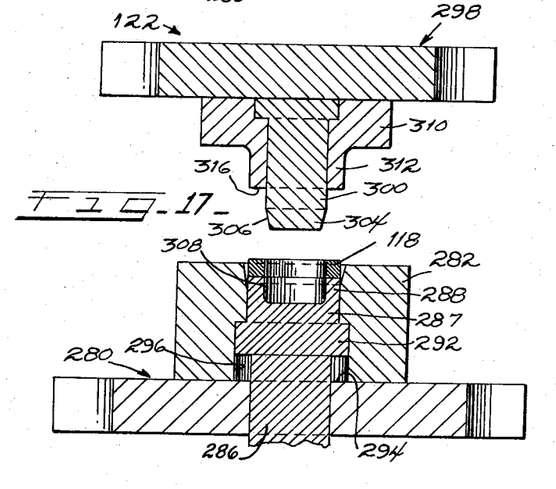

Associated with the lower die plate 282 is a plunger or post 286 provided with a head portion 288 that complements the configuration of the forming surface 284 and is provided with an annular upwardly facing coining surface 290 that defines one of the side surfaces of the locking collar.

The plunger or post 286 is formed with a flange portion 292 which seats as at 294 on the plate structure 280 which is supported or braced against movement in any suitable manner. The plunger or post 286 is connected to a suitable hydraulic cylinder for the purpose of moving it from the position of FIGURE 15 to the position of FIGURE 17 and back again, flange portion 292 operating in chamber 296 of die plate 282.

The apparatus 122 also includes an upper die plate structure 298 having affixed thereto a punch member 300 defining a cylindrical side surface 302 that forms the coining surface for the inside diameter of the locking collar. Punch member 300 at its projecting end 304 is formed with a tapered surface 306 to provide ready entry through the element 118 during the coining operation, the end 304 projecting into recess 308 that is formed in the plunger or post member 288 in the closed position of the die (see FIGURE 16).

Associated with the punch member 300 is an annular plate member 310 defining a collar portion 312 having an external cylindrical surface 314 proportioned to substantially complement the cylindrical coining surface 284 of die plate 282. The collar portion 312 terminates in a planar downwardly facing annular coining surface 316 which is intended to engage the upwardly facing side of the element 118 as the coining operation is completed.

The top plate structure 298 is operated by a suitable hydraulic ram arrangement to move it between the various positions illustrated in FIGURES 15-17.

In use, element 118 in the form it has assumed as a result of the operational steps described in connection with the showing of FIGURES 11 and 12 is placed on the tapered mouth 285 of die plate 282, and the top plate structure 298 is then lowered (it being understood that at this point in the operation the plunger or post 286 is in the position of FIGURE 15). As downward movement of the top plate structure continues, the punch member moves through the element 118 and down into and through the space defined by coining surface 284. In the meantime, the coining surface 316 of the top plate engages the upwardly facing end surface of the element 118 and the element 118 is then forced downwardly through the mouth 285 and into the space defined by coining surface 284. The top die plate structure moves to the position of FIGURE 16 to fully position the element 118 within the space defined by the coining surface 284 and against the coining surface 290 of the plunger or post 286, by which point the ends 270 and 272 will have been brought into interfitting abutting relation and a material flow will have occurred filling all of the space defined by the coining surfaces 284, 290, 302 and 316, which thus gives the locking collar blank its final annular dimensioning. In practice, the final annular configuration (except for the slot 130 and the cap screw holes and recesses) including the final dimensioning of the internal and external diameters is controlled, as by employing a pressure sensitive valve in the operation of the ram that actuates the top die plate structure 298, which valve initiates a reversal in the movement of the top plate structure when a predetermined pressure is achieved.

After the coining operation is completed, the top die plate structure 298 moves back to the position of FIGURE 15 (see FIGURE 17) and the plunger or post 286 is actuated to move it from the position of FIGURE 15 to the position of FIGURE 17 to free the coined locking collar blank from the coining surface to a floor.

Figure 14:
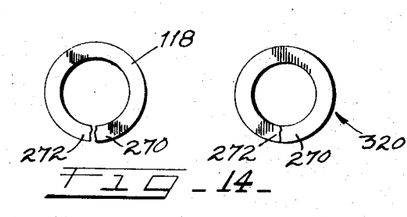
FIGURE 14 is a composite view showing in plan at the left side thereof the locking collar blank in the shape in which it is placed in the die of FIGURES 15–17 with the shape of the locking collar when it is removed from the die arrangement of FIGURES 15–17 being illustrated at the right hand side of the view.

The locking collar blank in its new shape is indicated at 320 in FIGURE 14, and it will be noted that ends 270 and 272 are tightly closed, with the saw marks in interfitting relation.

Any trademark or other identifying indicia that are to be applied to the locking collar may be appropriately applied to the coining surface 316, and it is thus contemplated that the plate 310 may be removably mounted in place so that different indicia may be applied to different locking collar blanks as may be desirable or necessary.

The locking collar blank 320 is thus now an annular planar member shaped to its final tolerances, but having its ends 270 and 272 in substantial abutting relation. In this condition, the locking collar blank is further processed to receive the cap screw and give it the necessary C-shape for the clamping purposes indicated in FIGURES 1–3 of the drawings.

Excising operations on lock collar blank

The collar blank 320 is then applied to a suitable clamping mechanism diagrammatically indicated at 330 in FIGURES 18–23 that is arranged to firmly hold it during the excising procedures and this may be done in any convenient manner known to the art.

In the first excising operation, the ends 270 and 272 are excised where indicated at 332 and 334 as by employing the diagrammatically illustrated cylindrical milling tools 336. The excision 332 forms the initial opening that ultimately defines the recess 100 of FIGURE 4 while the excision 334 defines the opening 90 of FIGURE 4, and it will be noted that these excisions define planar surfaces 337 and 338 that facilitate further drilling and tapping operations.

In the next operation (see FIGURE 19) the surface 337 is drilled to form the opening 94 which receives the stem of the cap screw.

Figure 19:
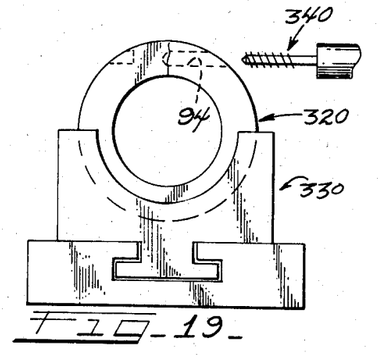

This may be done by using a suitable drilling tool indicated at 340.

Figure 20:
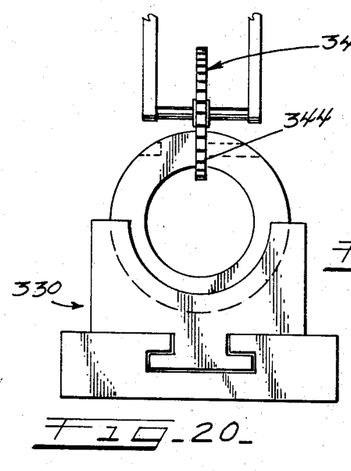

FIGURE 20 illustrates the next operation on the locking collar blank 320 in which a suitable saw device 342 is employed to form a swath through the locking collar blank that defines slot or space 130 of FIGURE 1. This is done in any suitable manner, but in accordance with this invention the swath, indicated at 344 in FIGURE 20, is made across the abutting terminal portions of the end portions 270 and 272 and only sufficient material is removed from the locking collar to define a slot 130 having planar surfaces 124 and 126 (see FIGURES 1, 4 and 21) that extend transversely of the locking collar in such a manner that the slot they define lies in a plane passing through the axial center of the locking collar blank 320.

Figure 21:
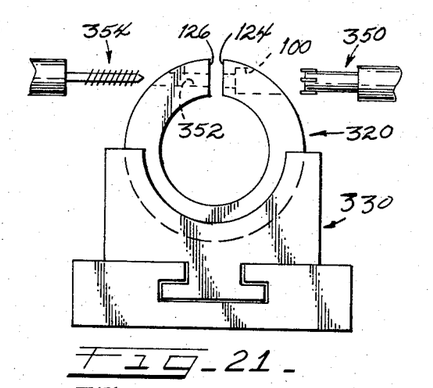

The locking collar blank 320 is then excised at excision 332 to define the cap screw head receiving recess 100, by employing a suitable milling tool 350, while the excision 334 is drilled through the end 272 to form the hole that receives the threaded end of the cap screw, as indicated at 352. This may be done by employing a suitable drilling tool 354.

Figure 22:
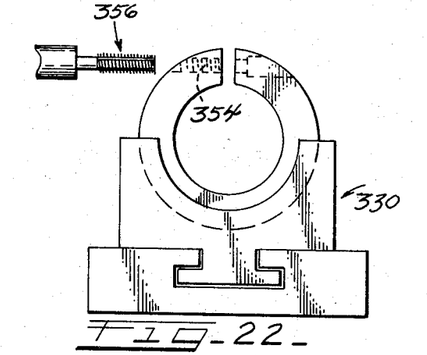
Figure 23:
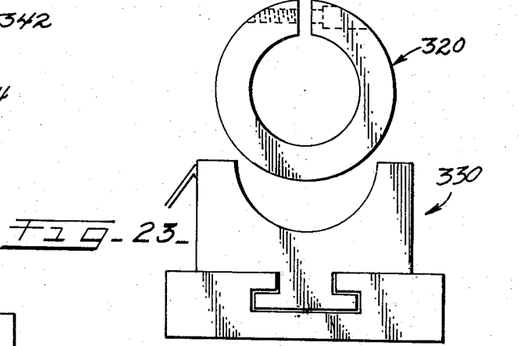

In the next excising procedure, the hole 352 is tapped to form the threaded surface 354 that threadedly receives the cap screw threads, and this may be done by employing a suitable tapping tool 356.

This completes the excision operations on the locking collar blank 320, which may now be released from the clamping mechanism 330 for further processing if necessary.

Figure 18:
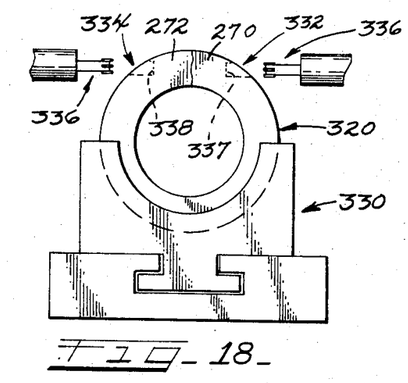
FIGURES 18–23 illustrate additional steps in making the final locking collar arrangement.

It will be noted that the milling steps indicated in FIGURE 18 (which may be performed simultaneously or separately) avoid the problem of having to drill into a curving surface disposed at an angle to a drilling tool. Since the ends 270 and 272 are in substantial abutting relation any compressive action on the locking collar blank by simultaneous operation of tools 336 cannot effect a bending action on the locking collar which would adversely effect the formation of excises 332 and 334. Furthermore, the relatively large hole 94 may be drilled against the firm holding action provided by the end portion 272, which avoids having to take precautions for tool slippage if the slot 130 existed at this point.

It is then a relatively simple matter to complete the excising operations indicated by the showing of FIGURES 21 and 22, after the slot 94 is formed.

The locking collar blank 320 has now been shaped to the configuration shown in FIGURES 1, 3 and 4, and if desired the locking collars thus formed may be tumbled to eliminate possible sharp edges and then provided with a suitable coating. In this connection, it is preferred that the locking collars made in accordance with this invention be coated with the nitrogen nickle compound sold under the trademark Pentrate by the Heat Bath Corporation.

After these procedures, the cap screw 82 (see FIGURE 4) is applied to complete the locking collar.

The remaining components of units 10 and 91 may be made in any convenient manner known to the art and readied for assembly following the methods indicated.

It will therefore be seen that I have provided novel and effective ways of making or assembling ball bearing assemblies and units, as well as a novel effective and inexpensive method of making locking collars therefor.

The bearing assembly arrangements shown in FIGURES 1 and 3 not only affix the inner race of the bearing assembly to the shaft in substantially perfect axial alignment with the axis of the shaft, the inner race is firmly clamped against any possible movement by merely suitably positioning the cap screw 82 so that the inner race clamping fingers 68 are drawn against the shaft surface.

As I prefer to apply the ball bearing assemblies 18 to the housings 12 through the housing loading slots 56, the over-all length of the inner race, when assembled to the outer race in the manner shown in FIGURE 1, must not extend at any point beyond the imaginary sphere that is defined by a projection of the contour of bearing seat 16 and outer race surface 22.

The bearing arrangements shown in FIGURES 1 and 3 of the drawings are also adapted for application to undersized or worn shafts and provided an appropriate gripping action even though the shaft tolerance difference may be in excess of two or three thousandths.

The units 10 and 91 represent only several of the specific types of housing units to which ball bearing assemblies 18 and their locking collars may be applied. Furthermore, in some applications it is not necessary that the assembly 18 be swivelly mounted, and in such cases the external surface of the outer race need not be spherically contoured.

It frequently happens that assemblies 18 and their locking collars 80 are sold separately from their housings, in which case the locking collars may be assembled on the respective assemblies 18 for facilitating shipping purposes.

Assemblies 18 may be applied to the housings of FIGURES 1 and 3 by following the methods of Glavan et al. Patent 2,952,898 to provide an alternate method of making these assemblies.

The method of making the locking collar herein disclosed has been found to make it possible to produce locking collars at a fraction of the cost of making them by a straight screw machine operation. Furthermore, machining of the locking collar is held to a minimum and the dimensioning of the internal and external diameters can be achieved with a tolerance and smoothness not possible in employing a screw machine.

The foregoing description and the drawing are given merely to explain and illustrate my invention and the invention is not to be limited thereto, except insofar as the appended claims are so limited, since those skilled in the art who have my disclosure before them will be able to make modifications and variations therein without departing from the scope of the invention.

I claim:
1. The method of making a ball bearing unit which comprises:
    positioning an annular one-piece outer race over an annular inner race having at least one end thereof extending beyond said outer race and formed with a plurality of slots extending longitudinally thereof, introducing a plurality of bearing balls between said inner and outer races, applying retaining means to hold the balls in properly spaced relation around the periphery of the inner race, forming a C-shaped clamping collar having an internal diameter substantially complementing that of said inner race end by:

coiling an elongate bar of substantially square section into a helix,     slitting the helix along one side thereof to separate the turns of the helix into segments to form individual locking collar members each defining terminal end portions,     press forming the individual collar members to a predetermined external configuration defining said internal diameter with said end portions of the respective members pressed together,     and then forming in said end portions aligned apertures with a slot therebetween, and with one of said aligned apertures having a shoulder for receiving the head of a cap screw and the other aperture being tapped to receive the thread of said cap screw, and     clamping said collar against said inner race end.

2. The method of making a ball bearing unit which comprises:

positioning an annular one-piece outer race over an annular inner race having at least one end thereof extending beyond said outer race and formed with a plurality of slots extending longitudinally thereof, introducing a plurality of bearing balls between said inner and outer races, applying retaining means to hold the balls in properly spaced relation around the periphery of the inner race, forming a C-shaped clamping collar having an internal diameter substantially complementing that of said inner race end by:

coiling an elongate bar of substantially square section into a cylindrical helix with the bar being bent laterally of the opposed side faces thereof,     slitting the helix along one side thereof to separate the turns of the helix into lock washer like elements each defining terminal end portions, and then further processing said elements as follows:

press forming the element axially thereof into a planar C-shape with said end portions spaced from each other,         then coining the element to a predetermined external diameter and said internal diameter and simultaneously bringing the end portions of the element into substantial abutting relation,         simultaneously milling aligned recesses in the element end portions that open at the periphery of said element and that are aligned in the plane of said element,         drilling through one of said recesses to freely receive the stem of a cap screw,         excising a uniform swath across the element end portions and transversely of the element to separate the element end portions,         simultaneously drilling through the other of said recesses to receive the cap screw stem threading and enlarging said one recess to receive the cap screw head,         tapping the hole of said other recess to threadedly receive the cap screw stem,         and applying a cap screw to the thus formed recesses, and     clamping said collar against said inner race end.

3. The method of making a ball bearing unit which comprises:

positioning an annular one-piece outer race over an annular inner race having at least one end thereof extending beyond said outer race and formed with a plurality of slots extending longitudinally thereof, introducing a plurality of bearing balls between said inner and outer races, applying retaining means to hold the balls in properly spaced relation around the periphery of the inner race, forming a C-shaped clamping collar having an internal diameter substantially complementing that of said inner race end by:

coiling an elongate bar of substantially square section into a helix,     slitting the helix along one side thereof to separate the turns of the helix into segments to form individual locking collar members each defining terminal end portions,     press forming the individual collar members to a predetermined external configuration defining said internal diameter with said end portions of the respective members pressed together,     and providing said collar end portions with a space therebetween and means for forcing said end portions toward each other, and     clamping said collar against said inner race end.

4. The method of making a ball bearing unit which comprises:

positioning an annular one-piece outer race over an annular inner race having at least one end thereof extending beyond said outer race and formed with a plurality of slots extending longitudinally thereof, introducing a plurality of bearing balls between said inner and outer races, applying retaining means to hold the balls in properly spaced relation around the periphery of the inner race, forming a C-shaped clamping collar having an internal diameter substantially complementing that of said inner race end by:

coiling an elongate bar of substantially square section into a helix,     slitting the helix along one side thereof to separate the turns of the helix into segments to form individual locking collar members each defining terminal end portions,     press forming the individual collar members to a predetermined external configuration defining said internal diameter with said end portions of the respective members pressed together,     and providing said collar end portions with a space therebetween and means for forcing said end portions toward each other,     the space between the end portions constituting a slot with opposed planar surfaces which flank the former juncture of said end portions, and said means for forcing said end portions toward each other comprising forming aligned openings in said end portions with one of said openings being tapped and the other provided with a shoulder and finally applying a cap screw to said openings adapted to force the opposed surfaces toward each other, and     clamping said collar against said inner race end.

5. The method of making a ball bearing unit which comprises:

positioning an annular one piece outer race over an annular inner race having at least one end thereof formed with a plurality of slots extending longitudinally thereof, introducing a plurality of bearing balls between said inner and outer races, applying retaining means to hold the balls in properly spaced relation around the periphery of the inner race, taking a C-shaped clamping collar having an internal diameter substantially complementing that of said inner race and made by the following method:
    coiling an elongate bar of substantially square section into a cylindrical helix with the bar being bent laterally of the opposed side faces thereof,
    slitting the helix along one side thereof to separate the turns of the helix into lock washer like elements each defining terminal end portions,
    and then further processing said elements as follows:
        press forming the element axially thereof into a planar C-shape with said end portions spaced from each other,
        then coining the element to a predetermined external diameter and said internal diameter and simultaneously bringing the end portions of the element into substantial abutting relation,
        simultaneously milling aligned recesses in the element end portions that open at the periphery of said element and that are aligned in the plane of said element,
        drilling through one of said recesses to freely receive the stem of a cap screw,
        excising a uniform swath across the element end portions and transversely of the element to separate the element end portions,
        simultaneously drilling through the other of said recesses to receive the cap screw stem threading and enlarging said one recess to receive the cap screw head,
    tapping the hole of said other recess to threadedly receive the cap screw stem, and applying a cap screw to the thus formed recesses, and then clamping the collar against said inner race one end by threading the cap screw to contract the collar.

References Cited

UNITED STATES PATENTS

| | | | |
|---|---|---|---|
| 2,667,689 | 2/1954 | Parks | 29—148.4 |
| 2,672,680 | 3/1954 | Gerner | 29—148.4 |
| 2,794,691 | 6/1957 | Noe | 308—72 |
| 2,840,399 | 6/1958 | Harless et al. | 287—53 |
| 3,189,979 | 6/1965 | Richmond | 29—148.4 |

CHARLIE T. MOON, *Primary Examiner.*

THOMAS H. EAGER, *Examiner.*